United States Patent
Kim et al.

(10) Patent No.: US 11,880,274 B2
(45) Date of Patent: Jan. 23, 2024

(54) HOST DEVICE, MEMORY CONTROLLER, AND COMPUTING SYSTEM INCLUDING THE SAME

(71) Applicant: SK hynix Inc., Icheon-si (KR)

(72) Inventors: Jeong Hyun Kim, Icheon-si (KR); Byong Woo Ryu, Icheon-si (KR); Ji Hun Choi, Icheon-si (KR); Sung Ju Yoo, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/694,466

(22) Filed: Mar. 14, 2022

(65) Prior Publication Data

US 2023/0074941 A1 Mar. 9, 2023

(30) Foreign Application Priority Data

Sep. 9, 2021 (KR) ........................ 10-2021-0120302

(51) Int. Cl.
*G06F 11/10* (2006.01)
*G06F 11/07* (2006.01)
*G06F 3/06* (2006.01)

(52) U.S. Cl.
CPC ........ *G06F 11/1068* (2013.01); *G06F 3/0619* (2013.01); *G06F 3/0656* (2013.01); *G06F 3/0659* (2013.01); *G06F 3/0679* (2013.01); *G06F 11/0772* (2013.01)

(58) Field of Classification Search
None
See application file for complete search history.

(56) References Cited

U.S. PATENT DOCUMENTS

| | | | |
|---|---|---|---|
| 2018/0039578 A1* | 2/2018 | Yun | G06F 3/0653 |
| 2020/0133566 A1* | 4/2020 | Kim | H04L 9/3247 |
| 2020/0142630 A1* | 5/2020 | Lee | G06F 3/0679 |
| 2021/0248076 A1* | 8/2021 | Musin | G06F 9/30196 |
| 2021/0286623 A1* | 9/2021 | Navon | G06F 11/0727 |

FOREIGN PATENT DOCUMENTS

| | | |
|---|---|---|
| KR | 20180016679 A | 2/2018 |
| KR | 20200038723 A | 4/2020 |

OTHER PUBLICATIONS

Kim K, Kim T. HMB in DRAM-less NVMe SSDs: Their usage and effects on performance. PLoS One. Mar. 2, 2020;15(3):e0229645. doi: 10.1371/journal.pone.0229645. PMID: 32119705; PMCID: PMC7051071. (Year: 2020).*

K. Kim, E. Lee and T. Kim, "HMB-SSD: Framework for Efficient Exploiting of the Host Memory Buffer in the NVMe SSD," in IEEE Access, vol. 7, pp. 150403-150411, 2019, doi: 10.1109/ACCESS.2019.2947350. (Year: 2019).*

* cited by examiner

*Primary Examiner* — Daniel F. McMahon
(74) *Attorney, Agent, or Firm* — Perkins Coie LLP

(57) ABSTRACT

A host device includes a Host Memory Buffer (HMB) including a plurality of memory areas, each memory area configured to store data provided from a storage device which is in communication with the host device, and a host controller configured to generate reliability information of each of the plurality of memory areas, and in communication with the storage device to provide the reliability information to the storage device.

19 Claims, 13 Drawing Sheets

Set Features − Feature Identifiers

| Feature Identifier | Description |
|---|---|
| 0Dh | Host Memory Buffer |

Host Memory Buffer − X

| Bits | Description |
|---|---|
| N:00 | Reliability (RT) |

HOST DEVICE, MEMORY CONTROLLER, AND COMPUTING SYSTEM INCLUDING THE SAME

CROSS-REFERENCE TO RELATED APPLICATION(S)

This patent application document claims priority to and benefits of the Korean patent application number 10-2021-0120302, filed on Sep. 9, 2021, which is incorporated herein by reference in its entirety.

TECHNICAL FIELD

The technology and implementations disclosed in this patent application document relate to an electronic device, and more particularly, to a host device, a memory controller, and a computing system including the same.

BACKGROUND

Storage devices refer to electronic components that are configured to store data based on a control of a host device such as a computer or a smart phone. The storage device may include a memory device for storing data and a memory controller for controlling the memory device. The memory device is classified into a volatile memory device and a nonvolatile memory device depending on its capability to hold stored data in the absence of power.

A volatile memory device may store data only when power is supplied. Thus, such a volatile memory device loses its data in the absence of power. Examples of the volatile memory device may include a Static Random Access Memory (SRAM), or a Dynamic Random Access Memory (DRAM).

A nonvolatile memory device is a memory device that can retain its data in the absence of power. Examples of the nonvolatile memory device may include a Read Only Memory (ROM), a Programmable ROM (PROM), an Electrically Programmable ROM (EPROM), an Electrically Erasable ROM (EEROM), or a flash memory.

SUMMARY

Embodiments of the disclosed technology provide a host device capable of improving the reliability of data stored in a Host Memory Buffer (HMB), a memory controller, and a computing system including the same.

In one aspect, there is provided a host device including: a Host Memory Buffer (HMB) including a plurality of memory areas, each memory area configured to store data provided from a storage device which is in communication with the host device; and a host controller configured to generate reliability information of each of the plurality of memory areas, and in communication with the storage device to provide the reliability information to the storage device.

In another aspect, there is provided a memory controller including: a data importance information generator configured to generate importance information of data; and a host memory buffer controller configured to receive reliability information of each of a plurality of memory areas from a host device, the plurality of memory areas are included in a Host Memory Buffer (HMB) of the host device, and to store the data in any one memory area among the plurality of memory areas based on the importance information and the reliability information.

In another aspect, there is provided a memory controller including: a host memory buffer controller configured to receive, from a host device including a Host Memory Buffer (HMB) configured to store data, data loss prediction information predicting a loss of the data stored in the HMB of the host device, and to request the data from the host device in response to the data loss prediction information; and a write operation controller configured to receive the data from the host device, and control a memory device in communication with the memory controller to store the data.

In another aspect, there is provided a computing system including: a host device including a Host Memory Buffer (HMB) including a plurality of memory areas configured to store data, the host device configured to generate reliability information of each of the plurality of memory areas; and a storage device in communication with the host device and configured to store the data in a memory area among the plurality of memory areas, based on importance of the data and the reliability information.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
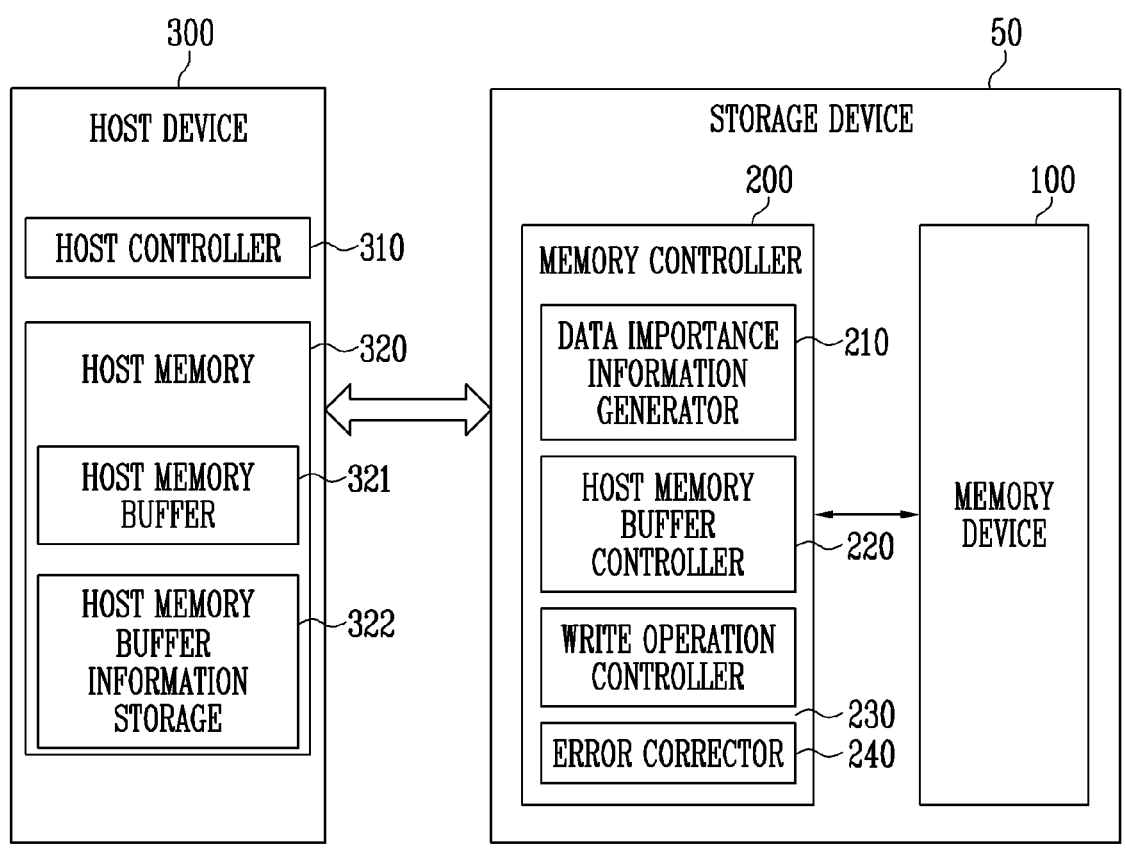
FIG. 1 is a diagram illustrating a computing system in accordance with an embodiment of the disclosed technology.

FIG. 1 is a diagram illustrating a computing system in accordance with an embodiment of the disclosed technology.

Referring to FIG. 1, the computing system 10 may include a storage device 50 and a host device 300.

The storage device 50 may include a memory device 100 and a memory controller 200 for controlling an operation of the memory device 100. The storage device 50 may be a device for storing data based on the control of the host device 300, such as a mobile phone, a smart phone, an MP3 player, a laptop computer, a desktop computer, a game console, a TV, a tablet PC or an in-vehicle infotainment system.

The storage device 50 may be manufactured as any one of various types of storage devices according to a host interface that is a communication scheme with the host device 300. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, or others.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 may operate based on the control of the memory controller 200. The memory device 100 may include a memory cell array (not shown) including a plurality of memory cells for storing data.

Each of the memory cells may be configured as any one of a Single Level Cell (SLC) storing one data bit, a Multi-Level Cell (MLC) storing two data bits, a Triple Level Cell (TLC) storing three data bits, and a Quadruple Level Cell (QLC) storing four data bits.

The memory cell array (not shown) may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this patent application document, as an example only, the memory device 100 is assumed as a NAND flash memory but other implementations are also possible.

The memory device 100 may receive a command CMD and an address ADDR from the memory controller 200, and access an area selected by the address ADDR in the memory cell array. The memory device 100 may perform an operation indicated by the command CMD on the area selected by the address ADDR. For example, the memory device 100 may perform a write operation (program operation), a read operation, and an erase operation. In the write operation, the memory device 100 may program data in the area selected by the address ADDR. In the read operation, the memory device 100 may read data from the area selected by the address ADDR. In the erase operation, the memory device 100 may erase data stored in the area selected by the address ADDR.

The memory controller 200 may control overall operations of the storage device 50.

When power is applied to the storage device 50, the memory controller 200 may execute firmware (FW). When the memory device 100 is a flash memory device, the FW may include a host interface layer (HIL) for controlling communication with the host device 300, a flash translation layer (FTL) for controlling communication between the host device 300 and the memory device 100, and a flash interface layer (FIL) for controlling communication with the memory device 100.

In an embodiment, the memory controller 200 may receive data and a Logical Block Address (LBA) from the host device 300, and translate the LBA into a Physical Block Address (PBA) representing addresses of memory cells included in the memory device 100, in which data is to be stored. In this patent document, the LBA, "logic address", and "logical address" may have the same meaning. In this patent application document, the PBA and "physical address" may have the same meaning.

The memory controller 200 may control the memory device 100 to perform a write operation, a read operation, an erase operation, or others, in response to a request from the host device 300. In the write operation, the memory controller 200 may provide a write command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may be connected to the memory device 100 through a channel. For example, the memory controller 200 may control the memory device 100 to perform a write operation, a read operation, an erase operation, or the like by providing a command and an address to the memory device 100 through the channel.

In an embodiment, the memory controller 200 may autonomously generate a command, an address, and data regardless of any request from the host device 300, and transmit the command, the address, and the data to the memory device 100. For example, the memory controller 200 may provide the memory device 100 with a command, an address, and data, which are used to perform read and program operations accompanied in performing wear leveling, read reclaim, garbage collection, etc.

In an embodiment, the memory controller 200 may control at least two memory devices 100. The memory controller 200 may control the memory devices according to an interleaving scheme so as to improve operational performance. The interleaving scheme may be a scheme for controlling operations on at least two memory devices 100 to overlap with each other.

The host device 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), or a Load Reduced DIMM (LRDIMM).

In an embodiment, the host device 300 may include a host controller 310 and a host memory 320.

The host controller 310 may drive an application for controlling the computing system 10, an Operating System (OS), or others. For example, the host controller 310 may include controllers, interfaces, a graphic engine, or others, which drive the application, the OS, or others. Exemplarily, the host controller 310 may include at least one of a Central Processing Unit (CPU), a Graphic Processing Unit (GPU), a System on Chip (SoC), or an Application Processor (AP).

In an embodiment, the host controller 310 may provide the memory controller 200 with information associated with a host memory buffer 321.

The host memory 320 may perform data input/output with the host controller 310. The host memory 320 may operate as a main memory, a working memory, a buffer memory, or a cache memory. The host memory 320 may include a volatile memory such as a DRAM or an SRAM.

In an embodiment, the host memory 320 may include the host memory buffer 321 and a host memory buffer information storage 322.

The host memory buffer 321 may be an area which the storage device 50 can access in the host memory 320. The host controller 310 may set a host memory buffer address, a host memory buffer size, or others, which the storage device 50 can access. The storage device 50 may read data from the memory device 100 and store the read data in the host memory buffer 321. When reference of data is necessary, the storage device 50 may read the data from the host memory buffer 321. When a value of data is updated, the storage device 50 may update the data stored in the host memory buffer 321. The storage device 50 may flush data stored in the host memory buffer 321 to the memory device 100.

In an embodiment, the host memory buffer 321 may include a plurality of memory areas. An address and a size of each of the plurality of memory areas may be set by the host controller 310.

The host memory buffer information storage 322 may store information associated with the host memory buffer 321. The information associated with the host memory buffer 321 may include a host memory buffer address, a host memory buffer size, reliability information of each of the plurality of memory areas, data loss prediction information, or others. The data loss prediction information may be information predicting that loss of data stored in the host memory buffer 321 will occur.

In an embodiment, the host controller 310 may generate reliability information of each of the plurality of memory areas, based on at least one of information associated with the durability of a memory area. In an embodiment, the information on the durability of the memory area may include a program/erase number of each of the plurality of memory areas, a number of times an error occurs in an error correction operation of data included in each of the plurality of memory areas, or others. The program/erase number may represent a number of times a program operation or an erase operation is performed. The error correction operation may be an operation of detecting an error of data, using parity data corresponding to the data, and correcting the detected error.

For example, the host controller 310 may determine that the reliability of a memory area becomes lower as the program/erase number of the memory area becomes higher or greater. Alternatively, the host controller 310 may determine that the reliability of a memory area becomes higher as the program/erase number of the memory area becomes lower or smaller.

In some implementations, the host controller 310 may determine that the reliability of a memory area becomes lower as the number of times an error occurs in an error correction operation of data included in the memory area becomes higher or greater. Alternatively, the host controller 310 may determine that the reliability of a memory area becomes higher as the number of times an error occurs in an error correction operation of data included in the memory area becomes lower or smaller.

In some implementations, the host controller 310 may generate reliability information of a memory area by complexly considering the program/erase number, the number of times the error occurs in the error correction operation, or others, which are described above.

In an embodiment, the host controller 310 may generate data loss prediction information, based on at least one of information associated with durability of the host memory 320. The information associated with the durability of the host memory 320 may include temperature information of the host memory 320, a program/erase number of the host memory 320, a number of times an error occurs in an error correction operation of data included in the host memory buffer 321, or others.

For example, when the temperature of the host memory 320 exceeds a predetermined threshold value, the host controller 310 may determine that loss of data stored in the host memory buffer 321 will occur. In some implementations, when the program/erase number of the host memory 320 exceeds a predetermined threshold value, the memory controller 310 may determine that loss of data stored in the host memory buffer 321 will occur. The program/erase number of the host memory 320 may include not only a number of times a program operation and an erase operation are performed in memory areas included in the host memory buffer 321 but also a number of times the program operation and the erase operation are performed in another area of the host memory 320. In some implementations, when the number of times the error occurs in the error correction operation of the data stored in the host memory buffer 321 exceeds a predetermined threshold value, the host controller 310 may determine that loss of data stored in the host memory buffer 321 will occur.

The host controller 310 may generate data loss prediction information by considering at least one of the temperature information, the program/erase number, the number of times the error occurs in the error correction operation, or others, which are described above.

In an embodiment, the memory controller 200 may include a data importance information generator 210, a host memory buffer controller 220, a write operation controller 230, and an error corrector 240.

The data importance information generator 210 may generate importance information of data by determining an importance of the data.

In an embodiment, the data importance information generator 210 may generate importance information, based on at least one of information associated with an importance of data. The information associated with the importance of the data may include whether a normal operation of the storage device 50 is possible according to corruption of the data (i.e., possibilities of a normal operation of the storage device 50 with an occurrence of a data corruption), whether the performance of the storage device 50 is influenced according to the corruption of the data, whether recovery of the data is possible after the data is corrupted (i.e., possibilities of a normal operation of the storage device 50 with an occurrence of a data corruption), or others. The data importance information generator 210 may generate importance information by considering information associated with the importance of the data.

For example, when the normal operation of the storage device 50 is impossible due to the corruption of the data, the data importance information generator 210 may determine that the importance of the data is high. Alternatively, when the normal operation of the storage device 50 is possible despite an occurrence of the corruption of the data, the data importance information generator 210 may determine that the importance of the data is low.

In some implementations, when the performance of the storage device 50 is influenced due to the corruption of the data, the data importance information generator 210 may determine that the importance of the data is high. The importance of the data may become higher as the influence on the performance of the storage device 50 becomes higher according to the corruption of the data. The performance of the storage device 50 may include an operation speed of the storage device 50, a temperature of the storage device 50, or others. Alternatively, when the performance of the storage device 50 is not influenced despite an occurrence of the corruption of the data, the data importance information generator 210 may determine that the importance of the data is low.

In some implementations, when the recovery of the data is impossible after the data is corrupted, the data importance information generator 210 may determine that the importance of the data is high. Alternatively, when the recovery of the data is possible after the data is corrupted, the data importance information generator 210 may determine that the importance of the data is low.

In an embodiment, the importance information of the data may include any one importance grade among a plurality of importance grades. The plurality of importance grades may be set based on a result obtained by comparing importance of a plurality of data.

The host memory buffer controller 220 may perform operations for accessing the host memory buffer 321. For example, the host memory buffer controller 220 may perform an operation of reading data from the memory device 100 and storing the read data in the host memory buffer 321, an operation of reading data from the host memory buffer 321, or others. In some implementations, the host memory buffer controller 220 may perform an operation of updating data stored in the host memory buffer 321 when a value of the data is updated, an operation of flushing data stored in the host memory buffer 321 to the memory device 100, or others.

In an embodiment, the host memory buffer controller 220 may receive, from the host device 300, reliability information of each of the plurality of memory areas included in the host memory buffer 321. The host memory buffer controller 220 may store the data in any one memory area among the plurality of memory areas, based on the importance information of the data and the reliability information of each of the plurality of memory areas. The reliability of the one memory area in which the data is stored may become higher as the importance of the data becomes higher. Alternatively, the reliability of the one memory area in which the data is stored may become lower as the importance of the data becomes lower. For example, the host memory buffer controller 220 may store the data in a memory area of which reliability is relatively higher among the plurality of memory areas as the importance of the data becomes higher. In some implementations, the host memory buffer controller 220 may store the data in a memory area of which reliability is relatively lower among the plurality of memory areas as the importance of the data becomes lower.

Thus, in accordance with the embodiment of the disclosed technology, data is stored based on reliability for each memory area of the host memory buffer 321, so that the reliability of the data stored in the host memory buffer 321 can be improved.

In an embodiment, the host memory buffer controller 220 may receive, from the host device 300, a size of each of the plurality of memory areas included in the host memory buffer 321. The host memory buffer controller 220 may store the data in any one memory area among the plurality of memory areas, based on the importance information of the data and the size of each of the plurality of memory areas. For example, the size of the one memory area in which the data is stored may become larger as the influence of the data on the performance of the storage device 50 becomes higher. Alternatively, the size of the one memory area in which the data is stored may become smaller as the influence of the data on the performance of the storage device 50 becomes lower. For example, the host memory buffer controller 220 may store data having high influence on the performance of the storage device 50 in a memory area having a relatively large size among the plurality of memory areas. In some implementations, the host memory buffer controller 220 may store data having low influence on the performance of the storage device 50 in a memory area having a relatively small size among the plurality of memory areas.

The write operation controller 230 may control a write operation of storing data in the memory device 100.

In an embodiment, the host memory buffer controller 220 may receive data loss prediction information from the host device 300. The host memory buffer controller 220 may request data stored in the host memory buffer 321 from the host device 300 in response to the data loss prediction information. The write operation controller 230 may control the memory device 100 to receive data according to a request from the host device 300 and to store the received data.

In an embodiment, the data requested from the host device 300 may be data having a highest importance among data stored in each of the plurality of memory areas included in the host memory buffer 321. For example, the host memory buffer controller 220 may request the data having the highest importance from the host device 300. The write operation controller 230 may control the memory device 100 to receive the data having the highest importance from the host device 300 and to store the data having the highest importance.

The error corrector 240 may perform an error correction operation of data.

In an embodiment, when data stored in the host memory buffer 321 is received from the host device 300 after data loss prediction information is received from the host device 300, the error corrector 240 may perform the error correction operation of the received data. For example, the host memory buffer controller 220 may request data stored in the host memory buffer 321 from the host device 300 in response to the data loss prediction information. When the data stored in the host memory buffer 321 is received from the host device 300, the error corrector 240 may correct an error of the received data, and the write operation controller 230 may control the memory device 100 to store the data in which the error is corrected.

Thus, in accordance with the embodiment of the disclosed technology, data stored in the host memory buffer 321 is stored in the memory device 100 in response to data loss prediction information, so that a situation in which data loss will occur can be predicted in advance, thereby preserving the data stored in the host memory buffer 321.

Figure 2:
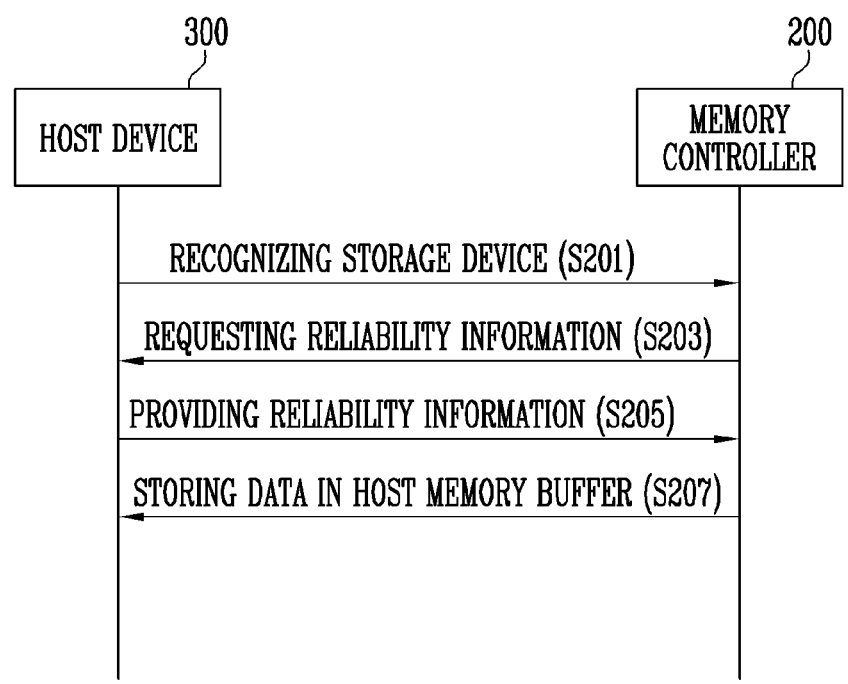
FIG. 2 is a diagram illustrating operations among a host device, a host memory buffer, and a memory controller in accordance with an embodiment of the disclosed technology.

FIG. 2 is a diagram illustrating operations among the host device, the host memory buffer, and the memory controller in accordance with an embodiment of the disclosed technology.

Referring to FIG. 2, in step S201, the host device 300 may recognize the storage device 50. For example, the host device 300 may identify whether the storage device 50 is to use the host memory buffer 321 by transmitting an identifier to the memory controller 200.

In step S203, the memory controller 200 may request, from the host device 300, reliability information of each of the plurality of memory areas included in the host memory buffer 321. For example, the memory controller 200 may request information associated with the host memory buffer 321 while notifying the host device 300 of whether the host memory buffer 321 is to be used. In an embodiment, the information associated with the host memory buffer 321 may include a host memory buffer address, a host memory buffer size, reliability information of each of the plurality of memory areas, data loss prediction information, or others.

In step S205, the host device 300 may provide the memory controller 200 with the reliability information of each of the plurality of memory areas. For example, the host device 300 may provide the memory controller 200 with information associated with the host memory buffer 321 through a specific command, for example, a set feature command. The set feature command may refer to commands defined by NVMe device to change the feature parameter settings.

In step S207, the memory controller 200 may store data in the host memory buffer 321, based on importance information of the data and the reliability information of each of the plurality of memory areas. For example, the memory controller 200 may store the data in any one memory area among the plurality of memory areas, based on the importance information of the data and the reliability information of each of the plurality of memory areas. The reliability of the one memory area in which the data is stored may become higher as the importance of the data becomes higher. Alternatively, the reliability of the one memory area in which the data is stored may become lower as the importance of the data becomes lower.

Figure 3:
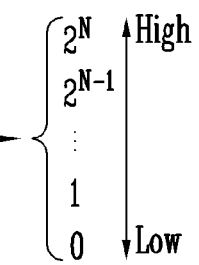
FIG. 3 is a diagram illustrating reliability information in accordance with an embodiment of the disclosed technology.

FIG. 3 is a diagram illustrating reliability information in accordance with an embodiment of the disclosed technology.

Referring to FIG. 3, when a feature identifier of a set feature command is 0 Dh, information on the host memory buffer 321 may be included in the set feature command. In an embodiment, the host device 300 may provide reliability information (Reliability, RT) to the memory controller 200 through the set feature command.

For example, a field of the reliability information may be included in position X of the set feature command. The position X may be included in any one area among a plurality of areas included in the set feature command. The plurality of areas may include Command Dword 11, Command Dword 12, Command Dword 13, Command Dword 14, Command Dword 15, Host Memory Descriptor List, Host Memory Buffer Descriptor Entry, Completion Queue Entry Dword 0, Attributes Data Structure, or others. The field of the reliability information may include 0 to N bits, and have values from '0' to '$2^N$.' The reliability information may include any one reliability grade among a plurality of reliability grades divided based on a result obtained by comparing reliabilities of the plurality of memory areas. For example, the reliability information may include any one reliability grade among a plurality of reliability grades configured with '0' to '$2^N$.' The reliability of the memory area may become lower as the reliability grade becomes closer to '0.' Alternatively, the reliability of the memory area may become higher as the reliability grade becomes closer to '$2^N$.'

Figure 4:
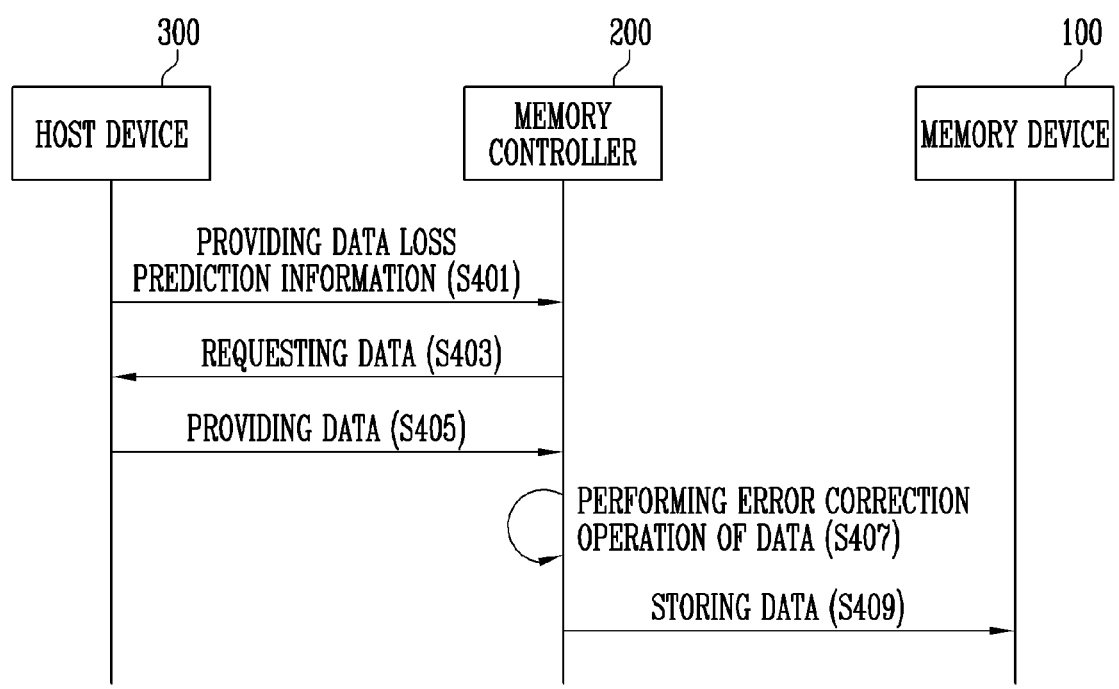
FIG. 4 is a diagram illustrating operations among the host device, the host memory buffer, the memory controller, and a memory device in accordance with an embodiment of the disclosed technology.

FIG. 4 is a diagram illustrating operations among the host device, the host memory buffer, the memory controller, and the memory device in accordance with an embodiment of the disclosed technology.

Referring to FIG. 4, in step S401, the host device 300 may provide data loss prediction information to the memory controller 200. In an embodiment, the host device 300 may provide the data loss prediction information to the memory controller 200 through the set feature command.

In step S403, the memory controller 200 may request data stored in the host memory buffer 321 in response to the data loss prediction information. In an embodiment, the memory controller 200 may request data having a highest importance among data stored in the host memory buffer 321.

In step S405, the host device 300 may provide the memory controller 200 with the data stored in the host memory buffer 321 in response to the request.

In step S407, the memory controller 200 may perform an error correction operation of data received from the host device 300.

In step S409, the memory controller 200 may store the data in which an error is corrected in the memory device 100.

Figure 5:
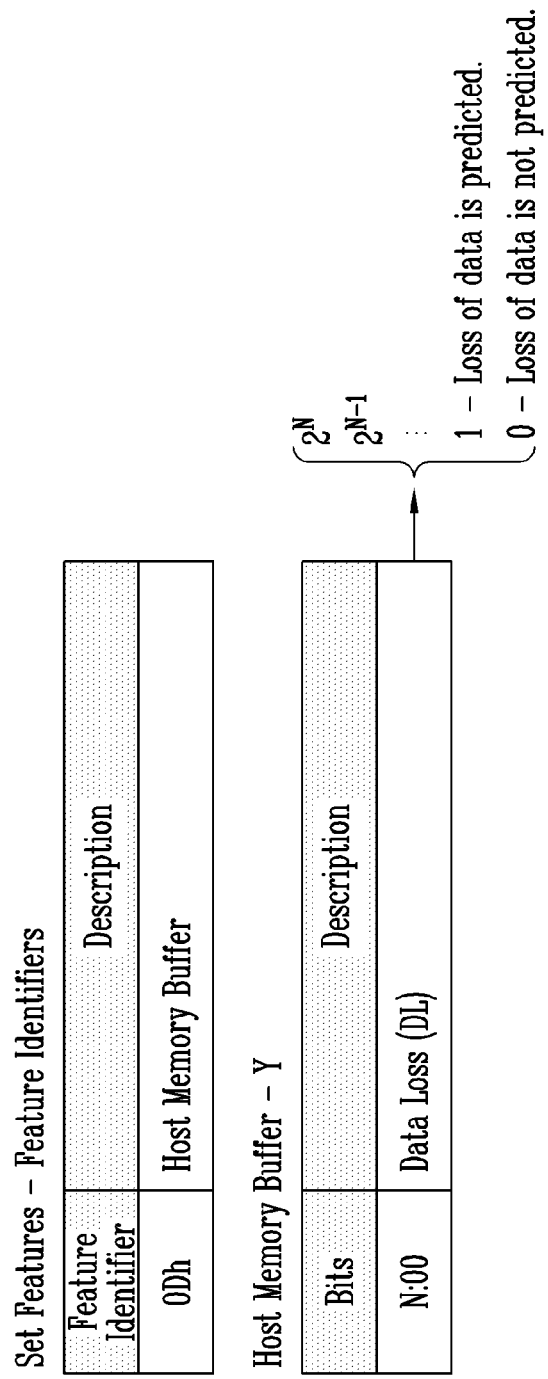
FIG. 5 is a diagram illustrating data loss prediction information in accordance with an embodiment of the disclosed technology.

FIG. 5 is a diagram illustrating data loss prediction information in accordance with an embodiment of the disclosed technology.

Referring to FIG. 5, when a feature identifier of a set feature command is 0 Dh, information on the host memory buffer 321 may be included in the set feature command. In an embodiment, the host device 300 may provide data loss prediction information (Data Loss, DL) to the memory controller 200 through the set feature command.

For example, a field of the data loss prediction information may be included in position Y of the set feature command. The position Y may be included in any one area among a plurality of areas included in the set feature command. The plurality of areas may include Command Dword 11, Command Dword 12, Command Dword 13, Command Dword 14, Command Dword 15, Host Memory Descriptor List, Host Memory Buffer Descriptor Entry, Completion Queue Entry Dword 0, Attributes Data Structure, or others. The field of the data loss prediction information may include 0 to N bits, and have values from '0' to '$2^N$.' In an embodiment, when the data loss prediction information includes '0,' the data loss prediction information may include information that any loss of data is not predicted. Alternatively, when the data loss prediction information includes '1,' the data loss prediction information may include information that loss of data is predicted.

Figure 6:
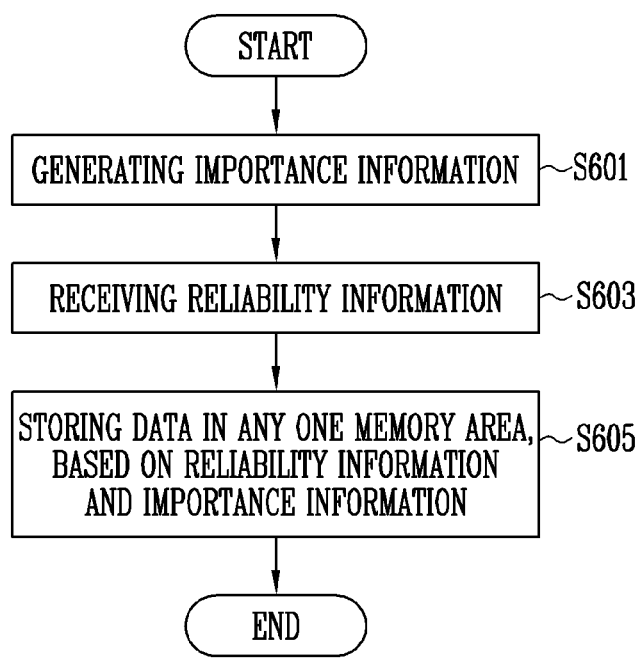
FIG. 6 is a diagram illustrating an example of an operating method of a memory controller in accordance with an embodiment of the disclosed technology.

FIG. 6 is a diagram illustrating an example of an operating method of a memory controller in accordance with an embodiment of the disclosed technology.

The operating method shown in FIG. 6 may be performed by the memory controller 200 shown in FIG. 1.

Referring to FIG. 6, in step S601, the memory controller 200 may generate importance information of data.

In step S603, the memory controller 200 may receive, from the host device 300, reliability information of each of a plurality of memory areas included in the host memory buffer 321. For example, the memory controller 220 may receive the reliability information of each of the plurality of memory areas through a set feature command.

In step S605, the memory controller 200 may store the data in any one memory area among the plurality of memory areas, based on the importance information of the data and the reliability information of each of the plurality of memory areas. The reliability of the one memory area in which the data is stored may become higher as the importance of the data becomes higher. Alternatively, the reliability of the one memory area in which the data is stored may become lower as the importance of the data becomes lower.

Figure 7:
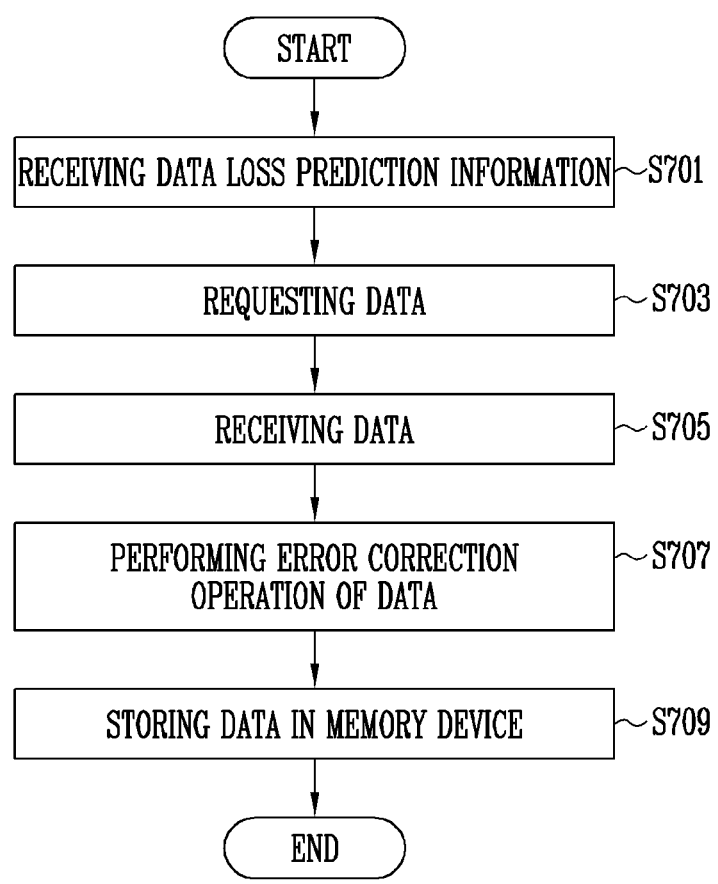
FIG. 7 is a diagram illustrating another example of an operating method of a memory controller in accordance with an embodiment of the disclosed technology.

FIG. 7 is a diagram illustrating another example of an operating method of a memory controller in accordance with an embodiment of the disclosed technology.

The operating method shown in FIG. 7 may be performed by the memory controller 200 shown in FIG. 1.

Referring to FIG. 7, in step S701, the memory controller 200 may receive data loss prediction information from the host device 300. For example, the memory controller 200 may receive the data loss prediction information through a set feature command.

In step S703, the memory controller 200 may request data stored in the host memory buffer 321 from the host device 300. The data requested from the host device 300 may be data having a highest importance among data stored in the host memory buffer 321.

In step S705, the memory controller 200 may receive the data from the host device 300.

In step S707, the memory controller 200 may perform an error correction operation of the data received from the host device 300.

In step S709, the memory controller 200 may store the data in which an error is corrected in the memory device 100.

Figure 8:
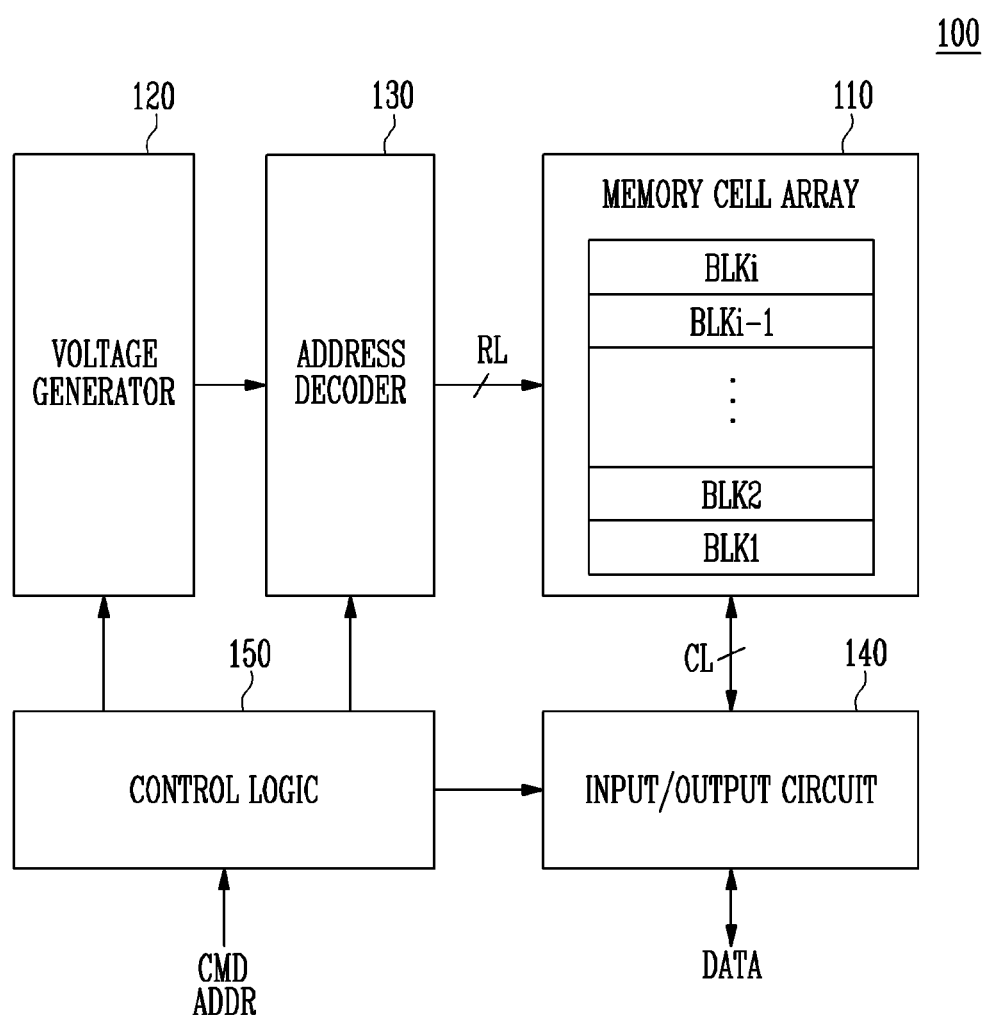
FIG. 8 is a diagram illustrating the memory device shown in FIG. 1.

FIG. 8 is a diagram illustrating the memory device shown in FIG. 1.

Referring to FIG. 8, the memory device 100 may include a memory cell array 110, a voltage generator 120, an address decoder 130, an input/output circuit 140, and a control logic 150.

The memory cell array 110 may include a plurality of memory blocks BLK1 to BLKi. The plurality of memory blocks BLK1 to BLKi may be connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

In an embodiment, the voltage generator 120, the address decoder 130, and the input/output circuit 140 may be commonly designated as a peripheral circuit. The peripheral circuit may drive the memory cell array 110 based on the control of the control logic 150. The peripheral circuit may driver the memory cell array 110 to perform a write operation, a read operation, and an erase operation.

The voltage generator 120 may generate a plurality of operating voltages by using an external power voltage supplied to the memory device 100. The voltage generator 120 may operate based on the control of the control logic 150.

In an embodiment, the voltage generator 120 may generate an internal power voltage by regulating the external power voltage. The internal power voltage generated by the voltage generator 120 may be used as an operating voltage of the memory device 100.

In an embodiment, the voltage generator 120 may generate a plurality of operating voltages by using the external power voltage or the internal power voltage. The voltage generator 120 may generate various voltages required in the memory device 100. For example, the voltage generator 120 may generate a plurality of erase voltages, a plurality of program voltages, a plurality of pass voltages, a plurality of select read voltages, and a plurality of unselect read voltages.

In order to generate a plurality of operating voltages having various voltage levels, the voltage generator 120 may include a plurality of camping capacitors which receive the internal power voltage. The voltage generator 120 may generate the plurality of operating voltages by selectively activating the plurality of pumping capacitors based on the control of the control logic 150.

The plurality of operating voltages generated by the voltage generator 120 may be supplied to the memory cell array 110 by the address decoder 130.

The address decoder 130 may be connected to the memory cell array 110 through the row lines RL. The address decoder 130 may operate based on the control of the control logic 150. The address decoder 130 may receive an address ADDR from the control logic 150. The address decoder 130 may decode a block address in the received address ADDR. The address decoder 130 may select at least one memory block among the memory blocks BLK1 to BLKi according to the decoded block address. The address decoder 130 may decode a row address in the received address ADDR. The address decoder 130 may select at least one word line among word lines of the selected memory block according to the decoded row address. In an embodiment, the address decoder 130 may decode a column address in the received address ADDR. The address decoder 130 may connect the input/output circuit 140 and the memory cell array 110 to each other according to the decoded column address.

In accordance with an embodiment of the disclosed technology, in a read operation, the address decoder 130 may apply a read voltage to the selected word line, and apply a read pass voltage having a level higher than that of the read voltage to unselected word lines.

Exemplarily, the address decoder 130 may include components such as a row decoder, a column decoder, and an address buffer.

The input/output circuit 140 may include a plurality of page buffers. The plurality of page buffers may be connected to the memory cell array 110 through the bit lines. In a write operation, data may be stored in selected memory cells according to data stored in the plurality of page buffers.

In a read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to a command CMD transferred from an external device. The control logic 150 may control the peripheral circuit by generating control signals in response to the command CMD and the address ADDR.

Figure 9:
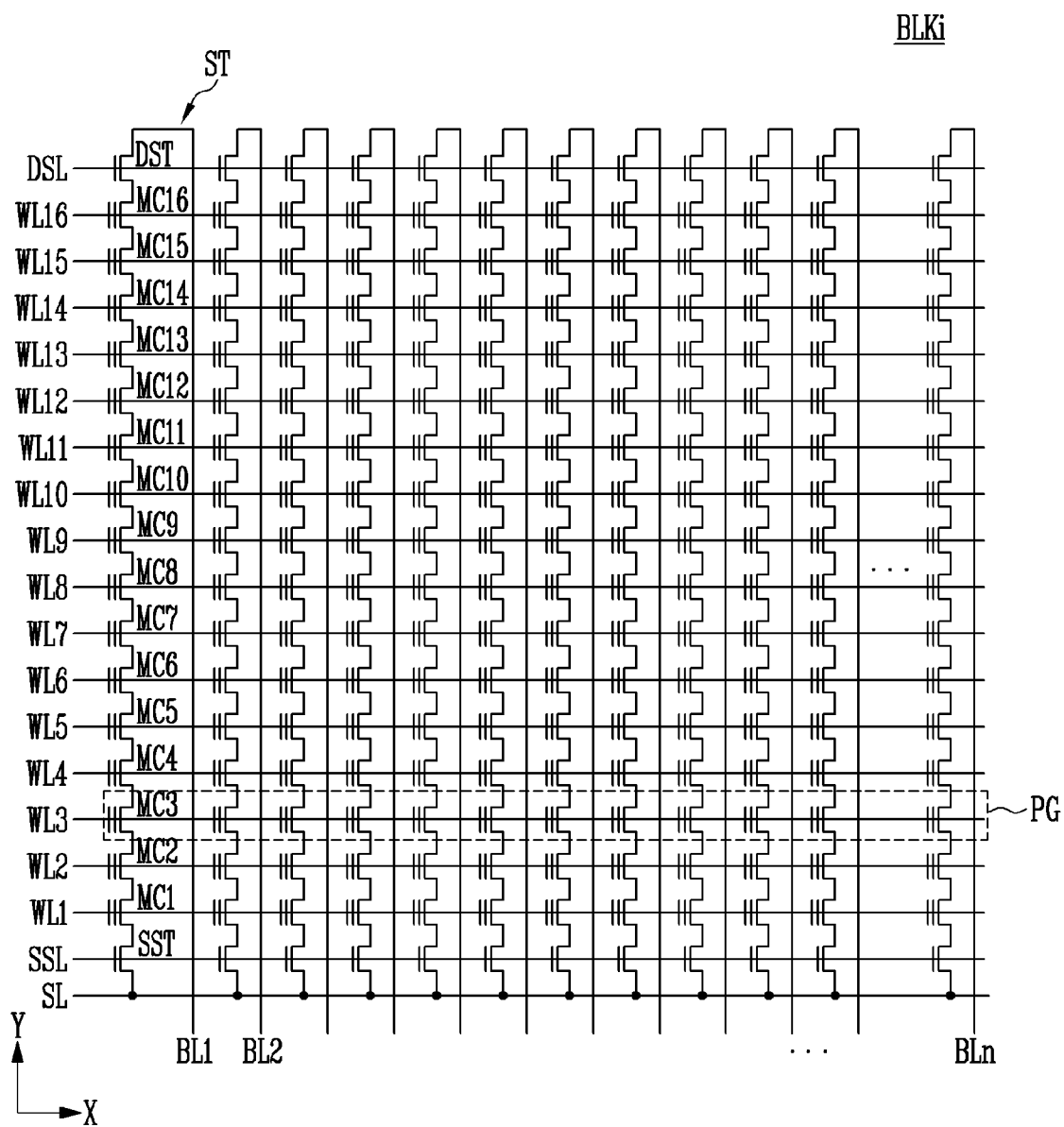
FIG. 9 is a circuit diagram illustrating any one memory block among memory blocks shown in FIG. 8.

FIG. 9 is a circuit diagram illustrating any one memory block among the memory blocks shown in FIG. 8.

A memory block BLKi represents any one memory block BLKi among the memory blocks BLK1 to BLKi shown in FIG. 8.

Referring to FIG. 9, in the memory block BLKi, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLm and a source line SL. The bit lines BL1 to BLm may be respectively connected to the strings ST, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells MC1 to MC16, and a drain select transistor DST, which are connected in series to each other between the source line SL and the first bit line BL1. At least one drain select transistor DST may be included in one string ST, and source select transistors of which a number is greater than that of the source select transistor SST shown in the drawing and memory cells of which a number is greater than that of the memory cells MC1 to MC16 shown in the drawing may be included in the one string ST.

A source of the source select transistor SST may be connected to the source line SL, and a drain of the drain select transistor DST may be connected to the first bit line BL1. The memory cells MC1 to MC16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells MC1 to MC16 may be connected to a plurality of word lines WL1 to WL16. A group of memory cells connected to the same word line among memory cells included in different strings ST may be referred to as a physical page PG. Therefore, physical pages PG corresponding to the number of the word lines WL1 to WL16 may be included in the memory block BLKi.

One memory cell may store one-bit data. The one memory cell is generally referred to as a single level cell (SLC). One physical page PG may store one logical page (LPG) data. One LPG data may include data bits corresponding to the number of cells included in the one physical page PG.

One memory cell may store two or more-bit data. One physical page PG may store two or more LPG data.

Figure 10:
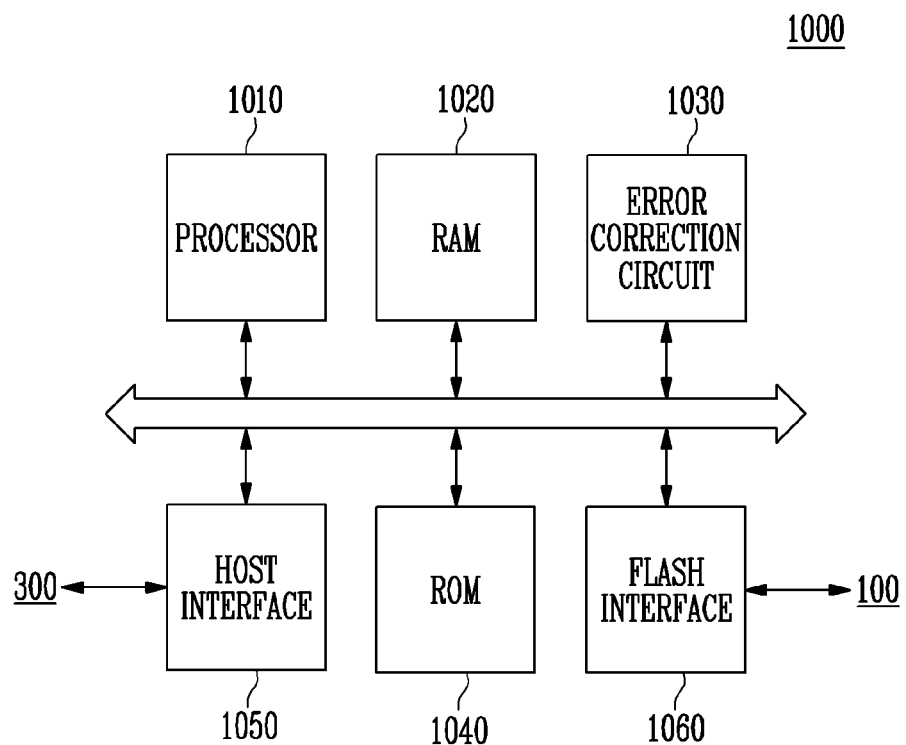
FIG. 10 is a diagram illustrating another example of the memory controller shown in FIG. 1.

FIG. 10 is a diagram illustrating another example of the memory controller shown in FIG. 1.

Descriptions of the memory controller 200 shown in FIG. 1 may also be applied identically to a memory controller 1000 shown in FIG. 10.

Referring to FIGS. 1 and 10, the memory controller 1000 may include a processor 1010, a RAM 1020, an error correction circuit 1030, ROM 1040, a host interface 1050, and a flash interface 1060.

The processor 1010 may control overall operations of the memory controller 1000. In an embodiment, the data importance information generator 210, the host memory buffer controller 220, and the write operation controller 230, which are shown in FIG. 1, may be implemented as one configuration of the processor 1010. Therefore, the processor 1010 may equally perform the operations of the data importance information generator 210, the host memory buffer controller 220, and the write operation controller 230, which are described with reference to FIG. 1.

The RAM 1020 may be used as a buffer memory, a cache memory, a working memory, or others.

The error correction circuit 1030 may perform error correction. The error correction circuit 1030 may perform error correction code (ECC) encoding on data to be written to the memory device 100 through the flash interface 1060. The ECC-encoded data may be transferred to the memory device 100 through the flash interface 1060. The error correction circuit 1030 may perform ECC decoding on data received from the memory device through the flash interface 1060. Exemplarily, the error correction circuit 1030 may be included as a component of the flash interface 1060 in the flash interface 1060. In an embodiment, the error corrector 240 shown in FIG. 1 may be implemented as one component of the error correction circuit 1030. Therefore, the processor 1010 may equally perform the operations of the error corrector 240, which are described with reference to FIG. 1.

The ROM 1040 may store, in the form of firmware, various information required in an operation of the memory controller 1000.

The memory controller 1000 may communicate with an external device (e.g., the host device 300, an application processor, or others) through the host interface 1050.

The memory controller 1000 may communicate with the memory device 100 through the flash interface 1060. The memory controller 1000 may transmit a command, an address, a control signal, or others to the memory device 100 through the flash interface 1060, and receive data. Exemplarily, the flash interface 1060 may include a NAND interface.

Figure 11:
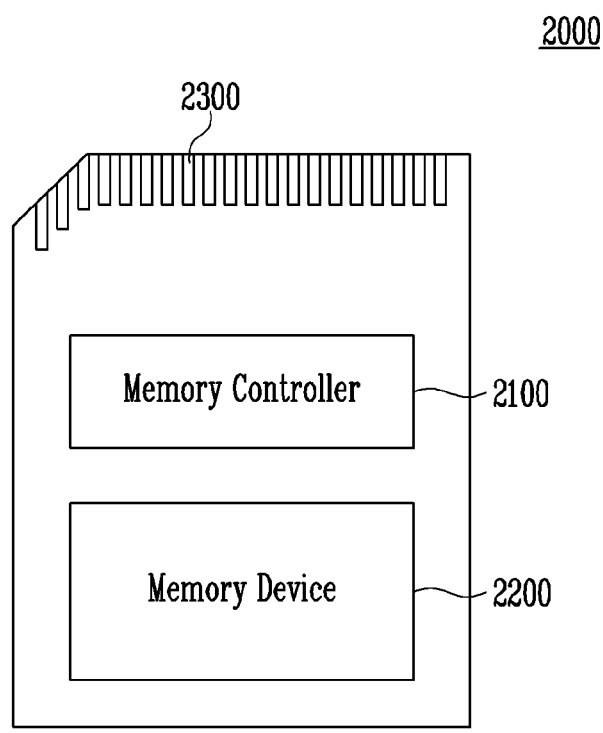
FIG. 11 is a block diagram illustrating a memory card system to which a storage device is applied in accordance with an embodiment of the disclosed technology.

FIG. 11 is a block diagram illustrating a memory card system to which a storage device is applied in accordance with an embodiment of the disclosed technology.

Referring to FIG. 11, the memory card system 2000 includes a memory controller 2100, a memory device 2200, and a connector 2300.

The memory controller 2100 is connected to the memory device 2200. The memory controller 2100 may access the memory device 2200. For example, the memory controller 2100 may control read, write, erase, and background operations of the memory device 2200. The memory controller 2100 provides an interface between the memory device 2200 and a host. The memory controller 2100 drives firmware for controlling the memory device 2200. The memory controller 2100 may be implemented identically to the memory controller 200 described with reference to FIG. 1. The memory device 2200 may be implemented identically to the memory device 100 described with reference to FIG. 1.

Exemplarily, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. Exemplarily, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, or NVMe. For example, the connector 2300 may be defined by at least one of the above-described various communication protocols.

In some implementations, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), or a Spin Transfer Torque magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 12:
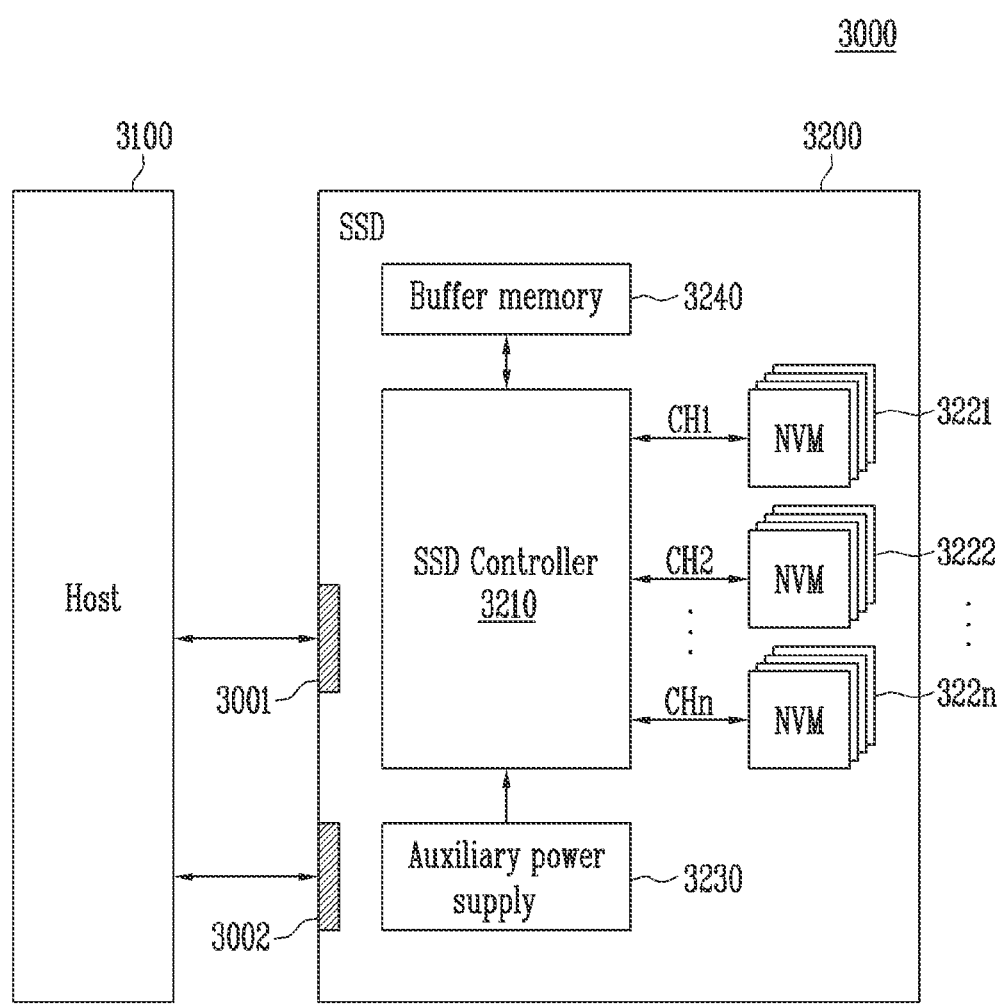
FIG. 12 is a block diagram illustrating a Solid State Drive (SSD) system to which the storage device is applied in accordance with an embodiment of the disclosed technology.

FIG. 12 is a block diagram illustrating a Solid State Drive (SSD) system to which the storage device is applied in accordance with an embodiment of the disclosed technology.

Referring to FIG. 12, the SSD system 3000 includes a host 3100 and an SSD 3200. The SSD 3200 exchanges a signal with the host 3100 through a signal connector 3001, and receives power through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal received from the host 3100. In some implementations, the signal may be a signal based on an interface between the host 3100 and the SSD 3200. For example, the signal may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, or an NVMe.

The auxiliary power supply 3230 is connected to the host 3100 through the power connector 3002. The auxiliary power supply 3230 may receive the power PWR input from the host 3100, and charge the power PWR. When the supply of power from the host 3100 is not smooth, the auxiliary power supply 3230 may provide power of the SSD 3200. Exemplarily, the auxiliary power supply 3230 may be located in the SSD 3200, or be located outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 13:
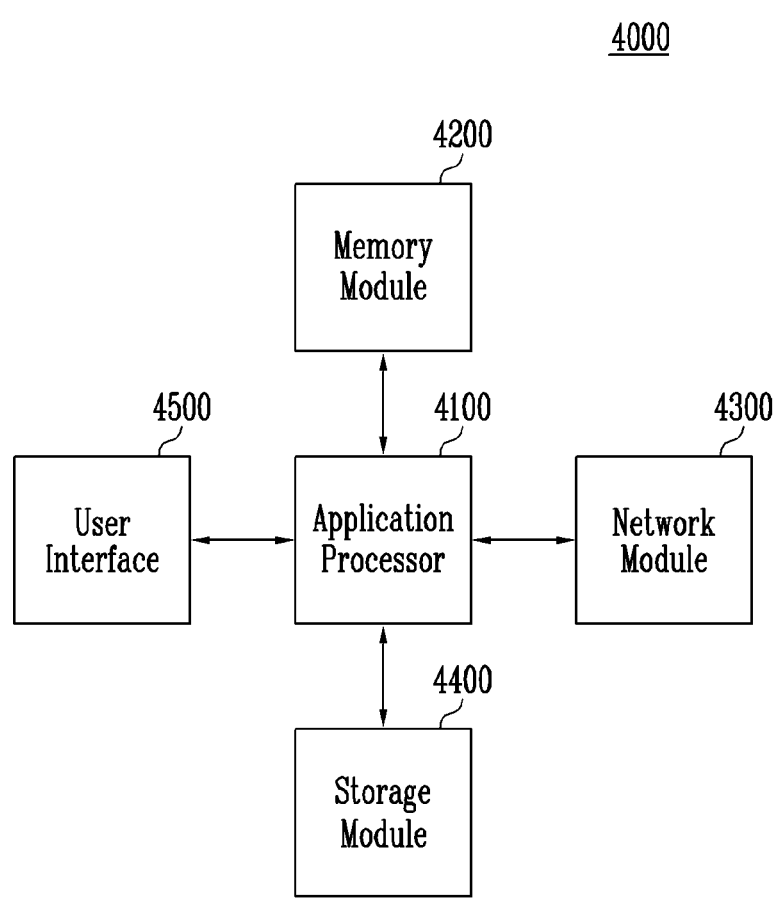
FIG. 13 is a block diagram illustrating a user system to which the storage device is applied in accordance with an embodiment of the disclosed technology.

FIG. 13 is a block diagram illustrating a user system to which the storage device is applied in accordance with an embodiment of the disclosed technology.

Referring to FIG. 13, the user system 4000 includes an application processor 4100, a memory module 4200, a network module 4300, a storage module 4400, and a user interface 4500.

The application processor 4100 may drive components included in the user system 4000, an operating system (OS), a user program, or others. For example, the application processor 4100 may include controllers for controlling components included in the user system 4000, interfaces, a graphic engine, or others. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, or a FRAM. Exemplarily, the application processor 4100 and the memory module 4200 may be provided as one semiconductor package by being packaged based on a Package on Package (PoP).

The network module 4300 may communicate with external devices. Exemplarily, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, or Wi-Fi. Exemplarily, the network module 4300 may be included in the application processor 4100.

The storage module 4400 may store data. For example, the storage module 4400 may store data received from the application processor 4100. Alternatively, the storage module 4400 may transmit data stored therein to the application processor 4100. Exemplarily, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. Exemplarily, the storage module 4400 may be provided as a removable drive such as a memory card of the user system 4000 or an external drive.

Exemplarily, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or commands to the application processor 4100 or outputting data to an external device. Exemplarily, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, or a monitor.

In accordance with the disclosed technology, there can be provided a host device capable of improving the reliability of data stored in a Host Memory Buffer (HMB), a memory controller, and a computing system including the same.

While this patent application document contains many specifics, these should not be construed as limitations on the scope of any disclosed technology or of what may be claimed, but rather as descriptions of features that may be specific to particular embodiments of particular disclosed technology. Certain features that are described in this patent application document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent application document should not be understood as requiring such separation in all embodiments.

The embodiments and implementations disclosed above are examples only and enhancements and variations to the disclosed embodiments and implementations and other embodiments and implementations can be made based on what is described and illustrated in this patent application document.

What is claimed is:

1. A host device comprising:
   a host memory buffer (HMB) including a plurality of memory areas, each memory area configured to store a plurality of data provided from a storage device which is in communication with the host device; and
   a host controller configured to generate reliability information of each of the plurality of memory areas, and in communication with the storage device to provide the reliability information to the storage device,
   wherein the host memory buffer is configured to store the plurality of data having different importance information in different memory areas of the plurality of memory areas, the different memory areas corresponding to different reliability information.

2. The host device of claim 1, wherein the reliability information includes a reliability grade that is selected from a reliability grades set based on a result obtained by comparing reliabilities of the plurality of memory areas.

3. The host device of claim 1, wherein the host controller is configured to generate the reliability information, based on at least one of a program/erase number of each of the plurality of memory areas and a number of occurrences of an error in an error correction operation of the plurality of data included in each of the plurality of memory areas.

4. The host device of claim 1, wherein the host controller is configured to generate data loss prediction information predicting a loss of data stored in the HMB, and provide the data loss prediction information to the storage device.

5. The host device of claim 4, wherein the host controller is configured to generate the data loss prediction information, based on at least one of temperature information of a host memory including the HMB, a program/erase number of the host memory, or a number of occurrences of an error in an error correction operation of data included in the HMB.

6. The host device of claim 4, wherein the host controller is configured to provide the reliability information to the storage device through a specific command.

7. A memory controller comprising:
   a data importance information generator configured to generate importance information of each of a plurality of data indicative of an importance level of the plurality of data; and
   a host memory buffer controller configured to receive reliability information of each of a plurality of memory areas from a host device, the plurality of memory areas being included in a host memory buffer (HMB) of the host device, and the host memory buffer configured to store the plurality of data having different importance information in the plurality of memory areas having different reliability information based on the importance information and the reliability information.

8. The memory controller of claim 7, wherein the data importance information generator is configured to generate the importance information, based on at least one of possibilities of a normal operation of a storage device including the memory controller with an occurrence of a data corruption, changes of a performance of the storage device depending on the data corruption, and chances of recovering corrupted data.

9. The memory controller of claim 7, wherein the reliability information includes a reliability grade that is selected from a reliability grades set based on a result obtained by comparing reliabilities of the plurality of memory areas.

10. The memory controller of claim 7, wherein the reliability information is generated based on at least one of a program/erase number of each of the plurality of memory areas and a number of occurrences of an error in an error correction operation of the plurality of data included in each of the plurality of memory areas.

11. The memory controller of claim 7, wherein the host memory buffer controller is configured to store data having a relatively higher importance in a memory area having a relatively higher reliability among the plurality of memory areas.

12. A computing system comprising:
 a host device including a host memory buffer (HMB) including a plurality of memory areas configured to store a plurality of data, the host device configured to generate reliability information of each of the plurality of memory areas; and
 a storage device in communication with the host device and configured to store the plurality of data having different importance information in the plurality of memory areas having different reliability information, based on the importance information of the plurality of data and the reliability information.

13. The computing system of claim 12, wherein the host device is configured to generate the reliability information, based on at least one of a program/erase number of each of the plurality of memory areas and a number of occurrence of an error in an error correction operation of the plurality of data included in each of the plurality of memory areas, and to provide the reliability information to the storage device through a specific command.

14. The computing system of claim 12, wherein the storage device is configured to generate the importance information, based on at least one of possibilities of a normal operation of the storage device with an occurrence of a data corruption, changes of a performance of the storage device depending on the data corruption, and chances of recovering corrupted data.

15. The computing system of claim 12, wherein the storage device is configured to store data having a relatively higher importance in a memory area having a relatively higher reliability among the plurality of memory areas.

16. The computing system of claim 12, wherein the host device is configured to provide the storage device with data loss prediction information predicting a loss of data stored in the HMB through a specific command.

17. The computing system of claim 16, wherein the host device is configured to generate the data loss prediction information, based on at least one of temperature information of a host memory including the HMB, a program/erase number of the host memory, and a number of occurrences of an error in an error correction operation of data included in the HMB.

18. The computing system of claim 16, wherein the storage device is configured to request data having a highest importance among the plurality of data stored in the HMB from the host device in response to the data loss prediction information, receive the data having the highest importance from the host device, and control the memory device to store the data having the highest importance.

19. The computing system of claim 16, wherein the storage device is configured to detect an error of data received from the host device and correct the error in response to receiving the data loss prediction information and further receiving data stored in the HMB from the host device.

* * * * *